United States Patent [19] [11] 4,185,903
Land [45] Jan. 29, 1980

[54] CAMERA HAVING SPATIALLY STABILIZED PHOTOCELL
[75] Inventor: Edwin H. Land, Cambridge, Mass.
[73] Assignee: Polaroid Corporation, Cambridge, Mass.
[21] Appl. No.: 862,750
[22] Filed: Dec. 21, 1977
[51] Int. Cl.² .................. G03B 7/00; G03B 19/00
[52] U.S. Cl. ............................... 354/59; 354/354
[58] Field of Search ............ 354/59, 23 R, 81, 354; 356/225; 250/234, 239; 350/285, 314; 248/286; 33/275 G; 74/5.1, 5.22; 352/243

[56] References Cited
U.S. PATENT DOCUMENTS

| | | | |
|---|---|---|---|
| 1,586,070 | 5/1926 | Cooke | 74/5.22 X |
| 2,076,482 | 4/1937 | Riszdorfer | 350/314 X |
| 2,364,363 | 12/1944 | Howell | 352/243 |
| 2,441,157 | 5/1948 | Kissel | 74/5.1 |
| 3,023,684 | 3/1962 | Stimson | 354/23 |
| 3,205,767 | 9/1965 | Weber et al. | 350/314 X |
| 3,291,996 | 12/1966 | Stimson | 250/234 |
| 3,413,272 | 12/1946 | Wheelwright | 354/81 |
| 3,442,191 | 5/1969 | Harvey | 354/59 |
| 4,027,540 | 6/1977 | Allard | 33/275 G X |

FOREIGN PATENT DOCUMENTS 831940  9/1938  France ................... 352/243

Primary Examiner—L. T. Hix
Assistant Examiner—Thomas H. Tarcza
Attorney, Agent, or Firm—David R. Thornton

[57] ABSTRACT

A system for spatially stabilizing the field of view of a photocell on a camera includes a ring mounted for pendulous movement about its central axis, parallel to the optical axis of the camera objective, a photocell lens mounted on the ring for limited pendulous movement about an axis perpendicular to the ring axis, and a photocell for receiving light passed by the lens from the scene being photographed. The pendulously mounted ring provides a roll sensitive control that maintains the field of view of the photocell, as determined by the photocell lens, in a fixed position in response to rotation of the camera about its optical axis while the pivotal lens mounting provides a pitch sensitive control that maintains the field of view of the photocell in a fixed spatial position in response to changes in the elevation angle of the camera. In one arrangement, a neutral density wedge, interposed between the lens and the photocell, is oriented so that its density gradient is aligned with the direction in which the ring is pendulously weighted such that the wedge modifies the light input transmitted to the photocell so as to make its output vary with respect to the camera elevation angle.

3 Claims, 6 Drawing Figures

CAMERA HAVING SPATIALLY STABILIZED PHOTOCELL

BACKGROUND OF THE INVENTION

This invention relates to a system for spatially stabilizing the field of view of a photocell mounted on a camera.

Proper exposure of relatively dark foreground objects using a photocell-controlled camera can be achieved, in the presence of relatively bright background lighting, by arranging for the field of view of the photocell to be inclined downwardly relative to the field of view of the camera objective. In this way, the photocell is preferentially responsive to the brightness of the foreground objects. In such cameras, vertical stabilization of the field of view of the photocell may also be maintained, for proper exposure of foreground objects, in the face of limited changes in elevation angle of the objective. Pitch sensing means for achieving the latter are known in the prior art, e.g., U.S. Pat. Nos. 2,076,482; 3,023,684; and 3,291,996.

While the cameras of the above-noted patents provide correction for pitch, they fail to provide any correction for roll, as for example, where the operator may rotate the camera 90° to take advantage of the dimensional differences in a rectangular film format. For the latter, proper exposure can be obtained only if the camera is also provided with means for maintaining the photocell view in a fixed spatial position in response to rotation of the camera about its optical axis. A camera provided with a system for spatially stabilizing the photocell view in both roll and pitch is disclosed in U.S. Pat. No. 3,442,191. In the last-mentioned patent, the field of view of the photocell is determined by the shape of the meniscus of a liquid partially filling a tube whose axis is parallel to the optical axis of the camera and which is located between the photosensitive surface of a photocell and the scene.

In response to the rotation of the above-noted camera about its optical axis, the attitude of the meniscus and its shape remain unchanged because of the symmetry of the tube about its axis, thus stabilizing the field of view in response to camera roll (rotation of the camera about its optical axis). In response to camera pitch (change in angle of elevation due to rotation of the camera about a pitch axis perpendicular to the optical axis of the camera), the stability of the field of view is dependent on the stability of the curvature of the meniscus since the meniscus acts as a lens located in front of the sensitive surface of the photocell. Unfortunately, the shape of the meniscus changes as the elevation angle of the camera changes primarily because of the nonsymmetry of the tube about the pitch axis. As a consequence, the photocell view shifts with any significant changes in the elevation angle of the camera as measured from the horizontal since the field of view is perturbed to the extent that the shape of the meniscus changes.

The stability of the field of view of the photocell in a camera utilizing the system disclosed in the lastmentioned patent in response to changes in camera elevation angle is thus significantly less than the stability in response to rotation of the camera from a horizontal to a vertical picture taking position. It is therefore an object of the present invention to provide a new and improved system for stabilizing the field of view of a photocell in such a manner as to provide satisfactory and substantially equal stabilization in response to both roll and pitch movement of a camera.

SUMMARY OF THE INVENTION

Briefly, the invention provides improved stability of the field of view of the light sensitive element under both roll and pitch camera movement by providing separate roll and pitch sensing means. In the preferred embodiment of the invention, a ring is mounted for pendulous rotational movement about its central axis which is parallel to the optical axis of the camera objective, and a photocell lens is mounted on the ring for pendulous pivotal movement thereto about an axis perpendicular to the axis of the ring. Because of the stability of the ring in response to rotation of the camera about its optical axis, the pivot axis of the photocell lens tends to remain perpendicular to the optical axis of the camera and thus defines a pitch axis. A light sensitive element, such as a photocell having a photosensitive surface is fixed to the support carrying the ring so as to receive light passed by the photocell lens from the scene being photographed.

Consequently, the pendulously mounted ring provides a roll sensing control that maintains the field of view of the photocell in a fixed spatial position in response to rotation of the camera about its optical axis between horizontal and vertical picture taking positions. The pendulously mounted lens provides a pitch sensing control that maintains the field of view of the photocell, at least within predetermined limits, in a fixed spatial position in response to changes in the elevation angle of the camera.

The invention also consists in the provision of a neutral density wedge interposed between the lens and the photosensitive surface of the photocell. The wedge is oriented so that its density gradient is aligned with the direction in which the ring is pendulously weighted and modifies the light input to the photocell so as to vary its output in response to the camera elevation angle. In this manner, as the camera is pointed downwardly to exclude more of the background lighting, the response of the photocell will be increased to provide proper exposure for foreground objects.

BRIEF DESCRIPTION OF THE DRAWINGS

An embodiment of the present invention is shown in the accompanying drawings wherein.

DESCRIPTION OF THE PREFERRED EMBODIMENT

Figure 1:
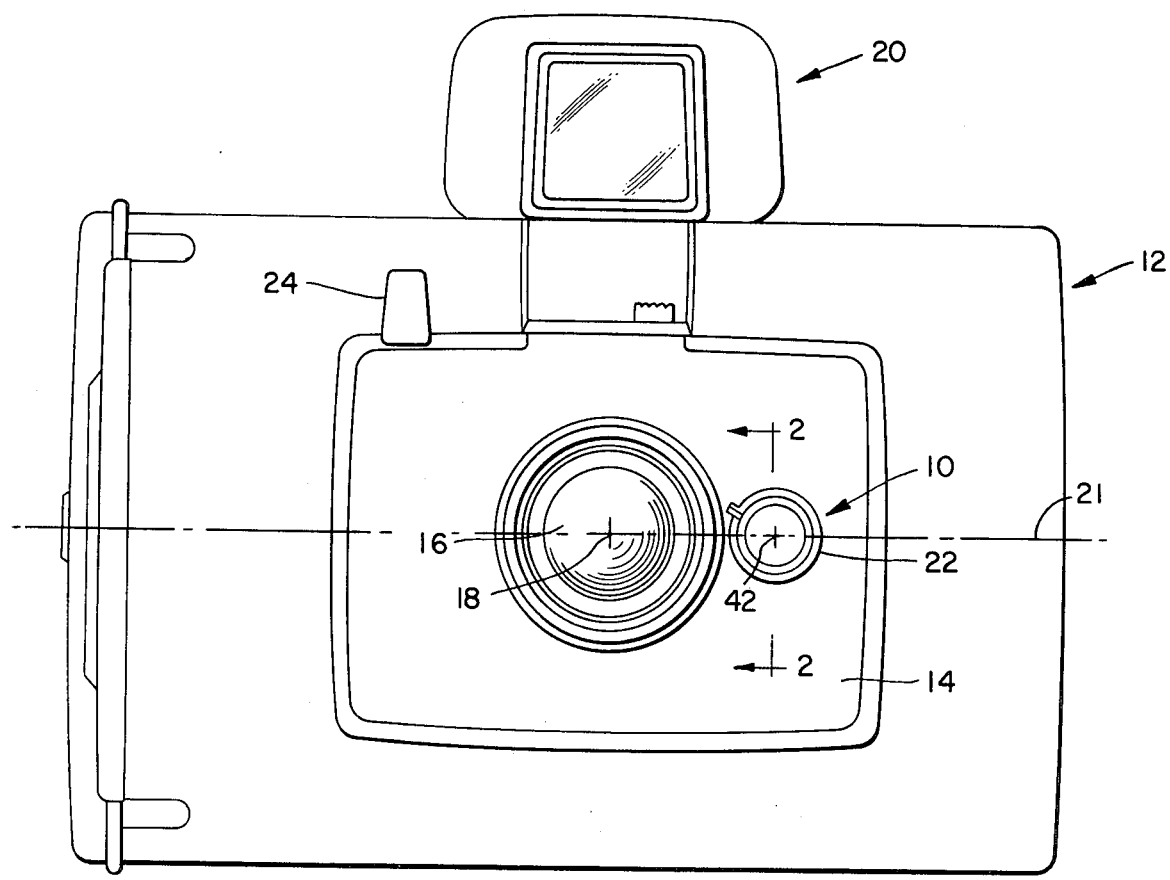
FIG. 1 is a front view of a camera incorporating the present invention.

Referring now to FIG. 1, reference numeral 10 designates a system for stabilizing the field of view of a photocell according to the present invention; the system being incorporated into camera 12 having a lens board 14 defining a support structure for the system and for the camera objective lens 16. Lens 16 established the optical or picture taking axis 18 (FIG. 2) of the camera which can be directed toward a scene to be photographed by the user viewing the scene through viewfinder 20. The film format of the camera is rectangular, which is to say that the aspect ratio (width to height) exceeds unity when the camera is oriented in the usual horizontal picture taking position shown in FIG. 1, and is less than unity when the camera is rotated 90° from the position shown in FIG. 1 about the optical axis to a vertical picture taking position.

A light sensing unit or photocell assembly 22 of system 10, mounted on the lens board, has a somewhat smaller field of view as compared to objective 16 and is operatively associated with circuitry (not shown) for controlling the amount of light passing the objective lens in response to manual depression of shutter actuator 24. For purposes of the present description, the taking axis 18 of the camera may be considered its roll axis while an axis 21 which traverses the camera perpendicular to, and intersecting, the axis 18 is defined as the main pitch axis of the camera.

Figure 2:
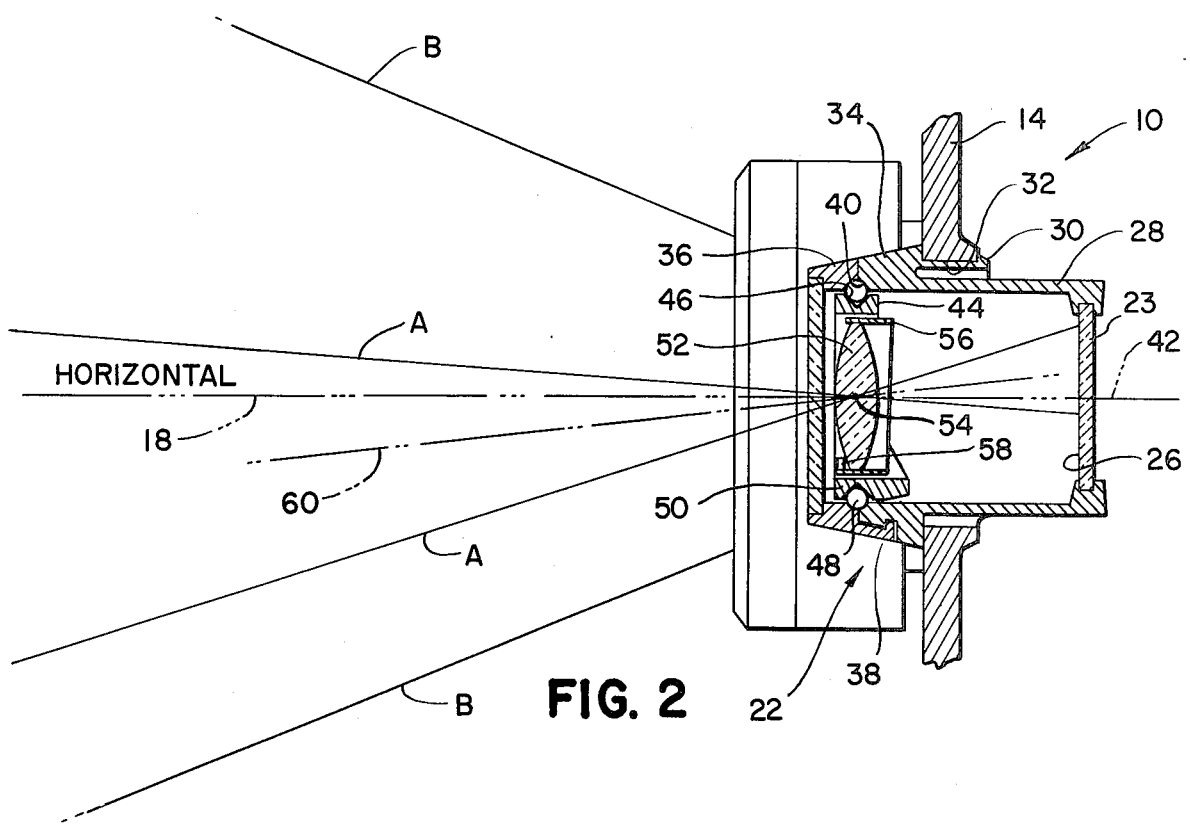
FIG. 2 is a section taken along line 2—2 of FIG. 1.

As shown in FIG. 2, the photocell assembly 22 includes a light sensing element or photocell 23, having a tubular housing 28; the latter having a plurality of resilient fingers 30 that snap into engagement with a matching circular aperture 32 in the supporting lens board 14. The front axial end 34 of housing 28 projects forwardly of the lens board and mates with coaxially positioned ring-shaped member 36 carrying a plurality of resilient fingers 38 that snap into correspondingly shaped depressions in the outer surface of end 34 of housing 28.

The inner portions of the mating surfaces of member 36 and housing 28 are provided with grooves 40 that cooperate to define means for forming an outer race fixed to the lens board 14, such grooves in effect defining an inwardly directed outer annular bearing surface defining a central axis 42 which is spaced from but extends parallel to optical axis 18 (see FIG. 1). A ring 44 having a diameter smaller than the internal diameters of housing 28 and member 36, is coaxially located therein adjacent grooves 40 and is provided with a circumferential groove 46 defining an outwardly directed inner annular bearing surface held coaxial with axis 42 when a complement of balls 48 is engaged between the annular bearing surfaces 40 and 46. Ring 44 is thus mounted on support 14 for rotation about axis 42 which is parallel to but spaced from optical axis 18. Finally, ring 44 is eccentrically weighted in one area as indicated at 50 so that the ring is pendulously pivotal about its axis 42.

Figure 6:
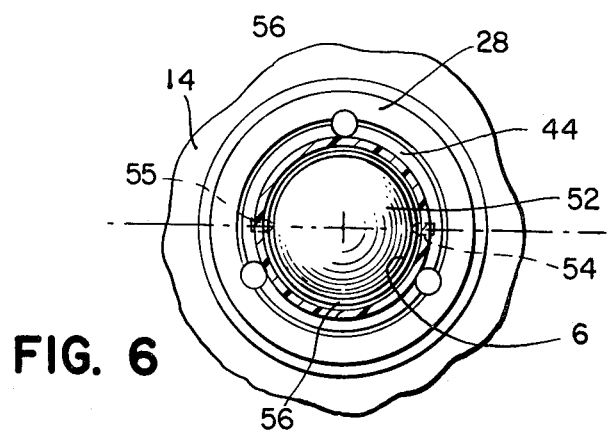
FIG. 6 is a front view of the photocell assembly with portions removed or cut away to illustrate details of the ring and photocell lens mounting.

A photocell lens 52 is mounted on the ring 44, i.e., on the inner race, for pivotal movement about an axis 54 perpendicular to the central axis 42 of the ring. To this end, suitable pins 55 (see FIG. 6) and socket bearings are provided in the lens 52 and the ring 44. The pivot axis 54 of the lens is fixed to the ring 44 so as to be perpendicular to its weighted portion 50 such that when the camera is held in its horizontal position, the lens axis 54 is parallel to the main pitch axis 21 of the camera. Lens 52 is held within a sleeve 56 which in effect, provides a pair of upper and lower stops that limit pivotal movement of the lens relative to the ring; and a weight 58 is attached to the lower stop so as to eccentrically weight the lens. As a consequence, the lens 52 is pendulously mounted on the ring 44 for limited pivotal movement around the pivot axis 54. Preferably, but not necessarily, the weight 58 is located, relative to the pivot axis 54, such that the central axis 60 of the field of view (indicated by lines A—A of FIG. 2) of the lens 52 is inclined slightly downwardly, i.e., at a negative angle, relative to axis 42 of ring 44 and hence downwardly relative to the optical axis 18 of the camera, when the camera is held level (see FIG. 2) in its normal horizontal picture taking position. Alternately, the lens may be vertically positioned but partially masked or ribbed in its upper portion, or otherwise formed such that the center 60 of its viewing angle A—A is pitched slightly downward. As a consequence, the field of view of the photocell is not only a smaller solid angle than the field of view of objective 16, indicated by lines B—B, but is downwardly directed as compared to the field of view of the objective. The extent to which the photocell "looks downwardly" is a parameter available to the designer and is determined by factors beyond the scope of the present invention.

When the camera is in its conventional attitude shown in FIG. 1, the weight 50 on the ring 44 holds the latter in a stabilized angular or rotational position (with pivot axis 54 retained in the horizontal plane) regardless of rolling movement of the camera while the weight 58 on the photocell lens 52 holds the latter in a stabilized angular position relative to its axis 54 (substantially vertical) regardless of camera pitch, at least until stops 56 engage the inner surface of ring 44. Within these constraints, the pivotal movement of lens 52 in response to pitching movement of the camera spatially stabilizes the photocell axis 60 and hence the field of view of the photocell. Thus, the pendulous mounting of the ring 44 for rotational movement around the axis 42 provides roll stabilizing means for maintaining the lens in a stabilized spatial position with respect to camera roll around the taking axis. Similarly, the pendulous mounting of the lens 52 on the ring 44 for pivotal motion around the axis 54 constitutes pitch stabilizing means responsive to pitching movement of the camera about pitch axis 54 (which is perpendicular to the photocell axis 60 as well as the ring axis 42 and the taking axis 18) for maintaining the field of view of the photocell in a fixed spatial position at least over a limited range as explained in detail below with regard to FIG. 3.

Advantageously, the ring mounting alows unlimited rotational freedom of the photocell lens around the ring axis 42, and hence, around an axis parallel to the taking axis 18. Hence, the latter will accommodate any degree of roll of the camera. For pitch, however, the pivotal freedom of the photocell lens is preferably limited by the stops 56 to within an angle of up to ±30° so that when the specified pitch angle is exceeded, the photocell is then pitched with the camera thereby reducing the contribution of the bright sky when the camera is sharply tilted downward and increasing this contribution when tilted sharply upward.

Figure 3:
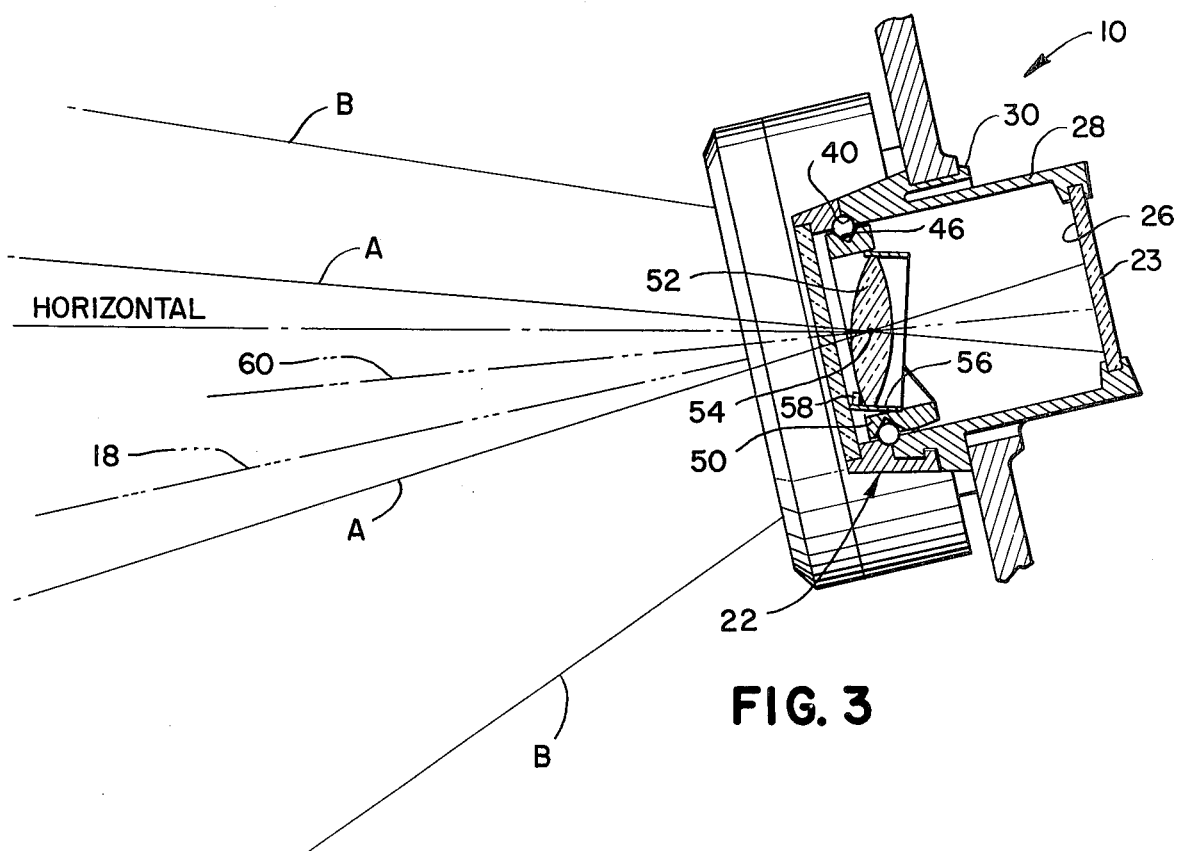
FIG. 3 is a sectional view similar to FIG. 2 illustrating the stability of the field of view of the photocell when the camera is pointed downwardly.

FIG. 3 shows the effect of depressing the camera to a negative elevation angle, optical axis 18 being inclined downwardly in FIG. 3 as compared to its horizontal position in FIG. 2. However, the spatial attitude of axis 60 of the photocell in FIG. 3 remains the same as in FIG. 2, that is, at the same angle to the horizontal. However, at a large angle, i.e., at an angle of approximately 30°, one of the stops 56 abuts ring 44 and any further change in elevation of the camera in the direction causing abutment (further depression in FIG. 3) imparts a corresponding tilting of lens 52 and consequent pitch of the field of view of the photocell with the camera.

Consequently, when the camera is rotated 90° about optical axis 18 from the horizontal picture taking position, rotational movement of the ring 44 spatially stabilizes the photocell axis 60 and hence the field of view of the photocell. By reason of this arrangement, the photocell will preferentially respond to darker foreground objects in the presence of bright background lighting when the camera is in either a horizontal or vertical picture taking position. As previously pointed out, however, for camera pitch it is preferable at large angles of inclination to have the photocell closely follow the camera inclination.

While the embodiment shown in the drawings and described above utilizes a light sensitive element 23 fixed to the camera housing, it is also possible to mount the photocell element on ring 44 or to pendulously mount both the photocell lens 52 and the photocell 23 in the ring 44. In the latter case, the photocell 23 is also stabilized in space, and the area of the photosensitive surface 26 illuminated by the photocell lens 52 always remains the same.

Advantageously, the effective response of the photocell may also be varied in accordance with the elevation angle of the camera by slightly modifying the embodiment of FIGS. 2 and 3. That is, the photocell response is made functionally related to elevation angle of the camera because it can be expected that more and more darker areas would be viewed by the photocell and the camera as the latter is depressed to a negative elevation angle. Under these circumstances, an improvement in film exposure can be provided by shifting the operating point on the characteristic curve associated with the photosensitive film; and this is achieved by decreasing, for a given scene illumination, the response or output of the photocell. Conversely, as the camera is tilted upwardly and brighter areas are viewed, photographic enhancement is achieved by increasing the output of the photocell.

Figure 4:
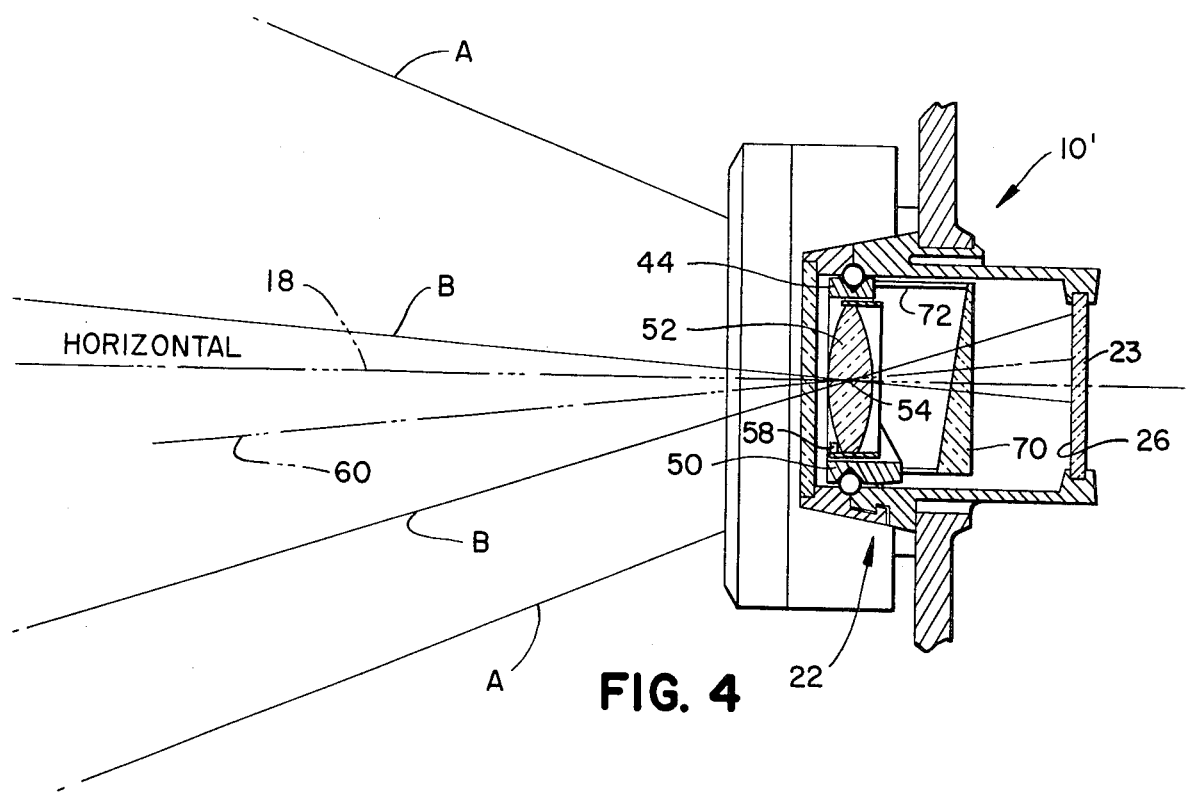
FIG. 4 is a sectional view similar to FIG. 2 of an alternate embodiment showing the interposition of a neutral density wedge between the photocell lens and the photosensitive surface of the photocell.
Figure 5:
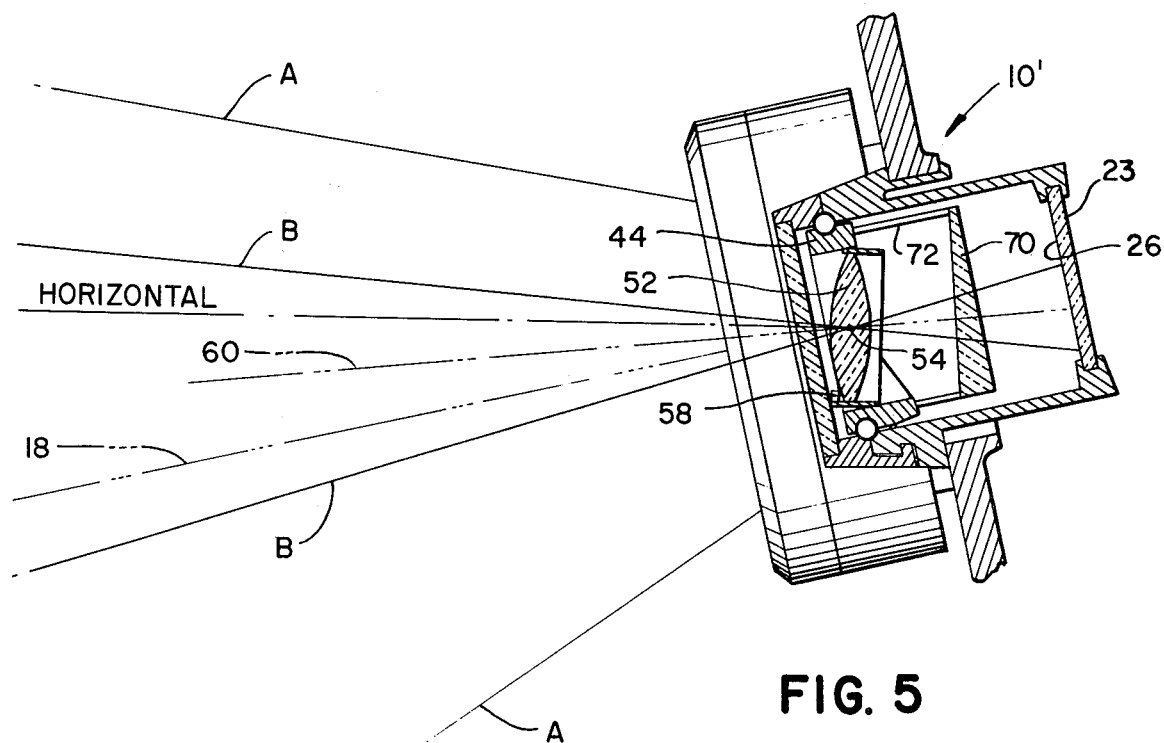
FIG. 5 is a sectional view similar to FIG. 4 showing a different orientation.

To functionally relate the output of the photocell to elevation angle, system 10' shown in FIGS. 4-5 utilizes a sensitivity control means in the form of a neutral density wedge 70 interposed between lens 52 and the photosensitive surface 26 of the photocell 23. Wedge 70 is physically attached to and movable with the ring 44 by reason of connecting arms 72. In this arrangement, the density gradient of the wedge is aligned with the direction in which ring 44 is weighted (vertically aligned) with the result that the wedge is stabilized with respect to the roll axis (optical axis 18). Consequently, the wedge will be operative to vary the cell input so long as the camera is tilted along the vertical axis regardless of camera roll.

As seen in FIG. 4, where camera elevation is 0°, the light passed by lens 52 is intercepted by wedge 70 in the middle region of the wedge causing a predetermined attenuation to take place before the light impinges on surface 26. As the elevation angle is made negative by depressing the camera (FIG. 5), the field of view of the photocell remains in a fixed spatial position as described above, but light passing through the photocell lens is now intercepted by the lower and thicker region of the wedge which reduces the intensity of light incident on surface 26. This has the effect of reducing the response of the photocell to scene light, and thereby increasing exposure time. The opposite is true when the elevation angle is made positive by tilting the camera upwardly.

As indicated, the functional relationship between the response of the photocell and the elevation angle of the camera is independent of the orientation of the camera relative to its optical axis (camera roll) since rotation of the camera about axis 18 causes opposite rotation of ring 44 to which the wedge is attached.

The sensitivity control means for establishing a functional relationship between photocell response and camera elevation angle can take other forms. For example, the pitch maintaining means (the pivoted lens 52) previously explained could be used to drive a potentiometer to electrically modify the circuitry associated with the photocell in accordance with the angle between the lens 52 and the lens board 14.

It is believed that the advantages and improved results furnished by the apparatus of the present invention are apparent from the foregoing description of the preferred embodiment of the invention. Various changes and modifications may be made without departing from the spirit and scope of the invention as sought to be defined in the claims that follow.

What is claimed is.

1. A photographic camera comprising:
a housing;
an objective lens defining the optical axis of the camera;
a photocell unit having a given field of view, said unit including a light sensitive element and a photocell lens for directing light onto a photosensitive surface of said element; and
means for mounting said photocell unit to spatially stabilize said field of view of said photocell unit, said mounting means comprising:
first bearing means responsive to limited pitching movement of the camera about a pitch axis perpendicular to the optical axis of the camera for maintaining the field of view of said photocell unit in a fixed spatial position;
second bearing means, independent of said first bearing means, and responsive to roll movement of the camera about its optical axis, for maintaining said field of view of said photocell unit in a fixed spatial position, said second bearing means including a ring pendulously mounted on said housing for rotation about an axis parallel to said camera optical axis with said photocell lens being mounted in said ring for directing light onto the photosensitive surface of said element; and
sensitivity control means for functionally relating the sensitivity of said photocell unit to the pitch angle of the camera optical axis such that said photocell unit has a predetermined sensitivity when the pitch angle of said camera optical axis is 0°, and wherein said sensitivity control means is constructed and arranged so that the response of said photocell unit is increased when the pitch angle is positive and reduced when the pitch angle is negative, said sensitivity control means including a wedge filter interposed between said photocell lens and the photosensitive surface of said element.

2. A photographic camera comprising:
a housing;
an objective lens defining the optical axis of the camera;
a photocell unit having a given field of view, said unit including a light sensitive element and a photocell lens for directing light onto the photosensitive surface of said light sensitive element; and means for mounting said photocell unit to spatially stabilize said field of view of said photocell unit, said mounting means comprising:

first bearing means responsive to limited pitching movement of the camera about a pitch axis perpendicular to the optical axis of the camera for maintaining the field of view of said photocell unit in a fixed spatial position; and second bearing means, independent of said first bearing means, and responsive to roll movement of the camera about its optical axis, for maintaining said field of view of said photocell unit in a fixed spatial position, said second bearing means including an outer race fixed to said housing and defining an inwardly directed outer annular bearing surface whose axis is parallel to, but spaced from, said optical axis and an inner race having an outwardly directed inner annular bearing surface coaxial with said axis of the outer annular bearing surface, said inner race being eccentrically weighted in a given area so as to provide pendulous mounting of said inner race within said outer race, and said first bearing means including a ring member adapted for mounting of said photocell lens, said ring being pivotally mounted in said inner race such that the weighted portion of said inner race is centrally located beneath the pivot points of said ring, and said ring member including a weighted portion centrally located between its pivot points so as to provide pendulous mounting of said ring in said inner race.

3. The camera of claim 2 including sensitivity control means for functionally relating the sensitivity of said photocell unit to the pitch angle of the camera optical axis such that said photocell unit has a predetermined sensitivity when the pitch angle of said camera optical axis is 0°, and wherein said sensitivity control means is constructed and arranged so that the response of said photocell unit is increased when the pitch angle is positive and reduced when the pitch angle is negative.

* * * * *